United States Patent
LaMothe et al.

(10) Patent No.: US 7,941,489 B2
(45) Date of Patent: May 10, 2011

(54) METHOD AND SYSTEM OF DETERMINING A HIERARCHICAL STRUCTURE

(75) Inventors: Brian P. LaMothe, Conrad, IA (US); Richard J. Vanderah, Marshalltown, IA (US); David S. Willett, Conrad, IA (US); Damon J. Ellender, Tomball, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 1658 days.

(21) Appl. No.: 11/041,540

(22) Filed: Jan. 24, 2005

(65) Prior Publication Data
US 2006/0164296 A1      Jul. 27, 2006

(51) Int. Cl.
*G06F 15/16* (2006.01)
(52) U.S. Cl. .................... 709/206; 709/217; 709/219
(58) Field of Classification Search ............ 709/206, 709/217, 219
See application file for complete search history.

(56) References Cited

U.S. PATENT DOCUMENTS

| 6,490,493 | B1 | 12/2002 | Dharnipragada |
| 6,735,639 | B2 * | 5/2004 | Higuchi ............................. 710/6 |
| 6,789,030 | B1 * | 9/2004 | Coyle et al. ..................... 702/77 |
| 7,020,701 | B1 * | 3/2006 | Gelvin et al. ................. 709/224 |
| 7,206,646 | B2 * | 4/2007 | Nixon et al. .................... 700/83 |
| 7,225,249 | B1 * | 5/2007 | Barry et al. .................. 709/227 |
| 7,522,568 | B2 * | 4/2009 | Twitchell, Jr. ............... 370/338 |
| 2003/0227392 | A1 * | 12/2003 | Ebert et al. ............... 340/825.49 |
| 2006/0229848 | A1 * | 10/2006 | Armstrong et al. ........... 702/184 |

* cited by examiner

*Primary Examiner* — Frantz B Jean
(74) *Attorney, Agent, or Firm* — Mark E. Scott; Conley Rose, P.C.

(57) ABSTRACT

Determining a hierarchical structure, possibly for delivery to an asset management system. Some exemplary embodiments may be a method comprising receiving a message originated by a data acquisition system and destined for a remote process controller (the receiving by a message router), using content of the message to determine a hierarchical structure of a system between the data acquisition system and the remote process controller, forwarding the message by the message router, and passing information related to the hierarchical structure to an asset management system.

22 Claims, 3 Drawing Sheets

METHOD AND SYSTEM OF DETERMINING A HIERARCHICAL STRUCTURE

BACKGROUND OF THE INVENTION

1. Field of the Invention

Various embodiments described herein are directed to distributed process control systems. More particularly, various embodiments are directed to determining and providing distributed control system hierarchical information to an asset management system.

2. Description of the Related Art

A growing trend in process control is distributed process control. Rather than having a single, centralized control center sending control commands to remote locations, the control functionality is moved closer to the controlled equipment. The centralized control center may then take a more supervisory role in the process control. For example, rather than sending a continuous stream of valve position commands to a valve controlling flow, the centralized control center may send a single flow set point to a remote process controller proximate to the valve, and allow the remote process controller to make valve position adjustments to achieve and maintain the desired flow. The data acquisition system may gather measurement data from field measurement and control equipment, and thus may be referred to as a supervisory control and data acquisition (SCADA) system.

Many of the commercially available field measurement and control equipment, such as remote process controllers and transmitters (e.g., pressure, flow, level, temperature), are implemented as microprocessor based devices. Because of the microprocessor based implementation, these devices may have the capability of digitally communicating status and configuration data about the devices themselves, in addition to their dedicated field task. The status and configuration data may be useful to a process engineer for tasks such as scheduling preventative maintenance and troubleshooting field equipment and/or processes.

In order to gather and possibly evaluate the status and configuration data, most process control systems implement an asset management system (AMS) in addition to one or more SCADA systems. An asset management system may communicate with field devices over the same communication channels as the SCADA system.

The hierarchical structure of a distributed process control system may be very complicated. For example, in a large petrochemical refinery, there may be tens, hundreds or thousands of remote process controllers reading measurement data from thousands of transmitters and controlling hundreds of devices which affect the state of the process, such as flow control valves, heaters, pumps, and the like. Similarly, yet more geographically diverse, a distributed control system may control hydrocarbon gathering across one or more hydrocarbon producing reservoirs, and thus may also employ tens or hundreds of remote process controllers and related equipment.

In the related art, for an asset management system to be usable, each and every piece of equipment for which the asset management system gathers status and configuration data has to be specifically entered into the database of the asset management system. Stated otherwise, unless the asset management system is told that a particular piece of field equipment exists on the network interconnecting various distributed control system components, the asset management system does not gather the status and configuration data about that particular piece of field equipment. Adding a piece of field equipment to an existing distributed process control system utilizing an asset management system may require a complete shutdown of at least the asset management system so that the hierarchy for the new equipment can be manually added to the asset management system's database. Manually entering data regarding the existence of each piece of field equipment, and that field equipment's location in the hierarchical structure of the process control system, is a tedious and time consuming venture.

Thus, what is needed in the art is a more efficient mechanism to gather hierarchical structure information, and to provide that information to an asset management system.

SUMMARY OF SOME OF THE PREFERRED EMBODIMENTS

The problems noted above are solved in large part by a method and related system of determining a hierarchical structure. At least some illustrative embodiments may be a method comprising receiving a message originated by a data acquisition system and destined for a remote process controller (the receiving by a message router), using content of the message to determine a hierarchical structure of a system between the data acquisition system and the remote process controller, forwarding the message by the message router, and passing information related to the hierarchical structure to an asset management system.

Other embodiments may be a message router comprising a first communication port and a second communication port coupled to the first communication port. The message router receives a message on the first communication port, and forwards the message out the second communication port. The message router reads content of the message and uses the content to determine, at least in part, a hierarchical structure of devices between the source of the message and the intended destination.

Yet still further embodiments may be a message routing system comprising a processor, a random access memory coupled to the processor, a first communication port coupled to the processor (the first communication port receives messages originated by a source device and destined for a target device), and a second communication port coupled to the processor (wherein the message routing system forwards at least some messages received on a first communication port through the second communication port). The processor, executing a program, reads content of the message and uses the content to determine configuration of devices between the source device and the target device.

Yet still other embodiments may be a system comprising a plurality of remote process controllers coupled to field devices, a message router coupled to the plurality of remote process controllers, a data acquisition system coupled to the message router, and an asset management system coupled to the message router. The message router snoops information from the message and uses the information to determine a tree structure between the data acquisition system and at least one of the plurality of remote process controllers.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect electrical connection via other devices and connections.

DETAILED DESCRIPTION OF THE PREFERRED EMBODIMENTS

Figure 1:
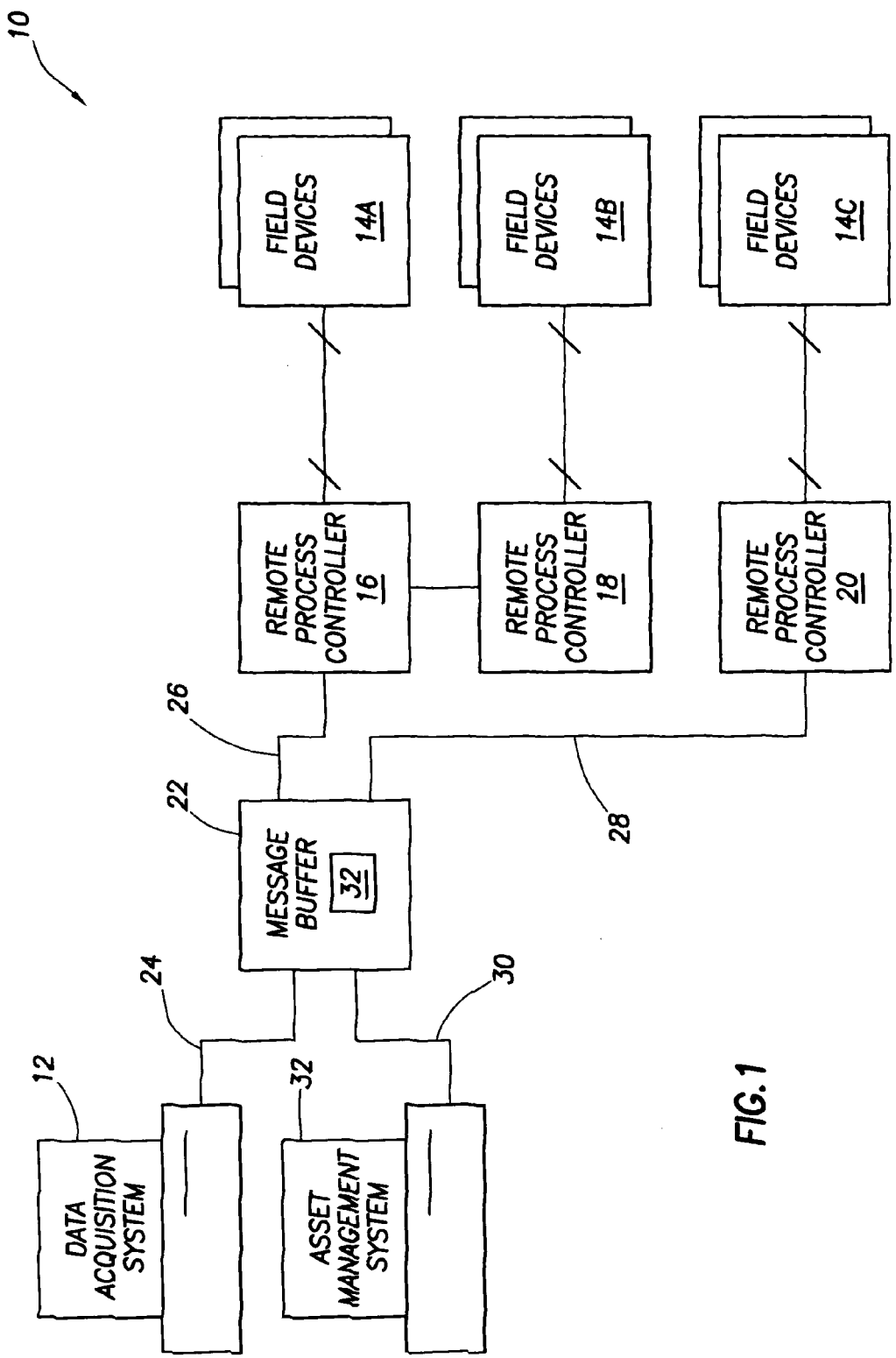
FIG. 1 shows a process control system in accordance with embodiments of the invention.

FIG. 1 presents an illustrative process control system 10 in which various embodiments of the invention may be implemented. In particular, the process control system 10 may comprise a data acquisition system 12. The data acquisition system 12 may be a central computer system responsible for gathering measurement data from field devices. The data acquisition system 12 may be a computer system executing software implementing functionality such as a historical database and/or a supervisory control and data acquisition system (SCADA) system. On the field side of the illustrative process control system of FIG. 1 may reside a plurality of field devices 14. Some of the exemplary field devices be transmitters, such as pressure transmitters, flow transmitter, temperature transmitters, and level transmitters. Others of the illustrative field devices 14 may be field control devices, such as control valves, motor control devices, and heater control devices. At least some of the field devices 14 may be "smart" devices which, in addition to generating measurement data and/or receiving commands, may also be capable of digitally communicating with upstream devices for the delivery of status and configuration data. For example, at least some of the field devices 14 may be highway addressable remote transducers (HART) compatible, and thus in addition to the capability of communicating via 4-to-20 mA current loops, the HART devices may also be capable of communicating their measurement data, and status and configuration data, over the 4-to-20 mA current loops. Use of a 4-to-20 mA current loop and/or HART digital communications over the current loop is merely illustrative. Any currently existing, or after developed, communications channel and protocol may be used in the communications to/from the field devices 14, such as Foundation FieldBus protocol, the MODBUS protocol, Profibus PA, Profibus DP, DeviceNet or ControlNet.

Still referring to FIG. 1, a plurality of remote process controllers couple to the field devices, and thus may be capable of the illustrative HART communications protocol. In particular, the process control system 10 of FIG. 1 illustrates three process controllers 16, 18 and 20 coupled to the field devices 14A, 14B and 14C respectively. FIG. 1 also shows an illustrative interconnection between the remote process controllers. In particular, communications from the data acquisition system 12 to the remote process controller 18, and its downstream field devices 14B, takes place through the remote process controller 16. Thus, if the data acquisition system 12 polls or requests information from the field devices 14A or 14B, that communication, at least in part, is directed to the remote process controller 16. When the data acquisition system 12 requests data from the field devices 14C, however, the data acquisition system message is directed to the remote process controller 20. Thus, FIG. 1 shows one illustrative hierarchical structure of a process control system 10. Many others are also possible. The field devices 14 and remote process controllers 16-20 could be any currently available, or after developed, devices. For example, the remote process controllers 16-20 could be Remote Operation Controllers (ROCs), commercially available from Emerson Process Management. Likewise, the field devices 14 could be any available transmitters of Rosemount Products, also produced by Emerson Process Management.

In order to facilitate communication between the data acquisition system 12 and the various downstream devices, such as the remote process controllers 16-20, FIG. 1 illustrates a message router 22 coupled between the data acquisition system 12 and the remote process controllers 16 and 20. The message router 22 may serve several functions. In at least some embodiments, the communications protocol on the communications channel 24 coupling the data acquisition system 12 to the message router 22 may be different than the communications protocol on the communications channel 26 between the message router 22 and the remote process controller 16. Likewise, the protocol on communications channel 24 may be different than the protocol on communication channel 28 coupling the message router 22 and the remote process controller 20. In some embodiments, the communications protocol on communications channels 24, 26 and 28 may all be different. Thus, the message router may perform protocol translations. The message router 22 may also perform link-layer translations for communications between the data acquisition system 12 and the various downstream devices. For example, communications channel 24 and communications channel 30 may be implemented as 100 Base T Ethernet, while communication channels 26 and 28 may be one selected from the group RS 485, RS 232, or some form of radio or satellite based communications channel.

Message router 22 may also perform message routing functions. For example, when data acquisition system 12 sends a message destined for one or more of the field devices 14, the message router 22 may select one of its remaining ports through which to send the message. In some embodiments, the selection of an appropriate port may be made by reference to routing table 32. In yet other embodiments, the data acquisition system 12 may be fully aware of the hierarchical structure of the remote process controllers 16-20 and field devices 14, and the message originating from the data acquisition system may itself comprise the routing information. Thus, the message router 22 may forward the message in conformance with content of the message. Communications from downstream devices, such as the remote process controllers 16-20 and field devices 14, to the data acquisition system 12 may have similar form and structure.

The illustrative process control system 10 also comprises asset management system 32. Inasmuch as at least some of the field devices 14 may be "smart" devices capable of communicating their status and configuration data, the asset management system 32 may communicate with those field devices to gather and analyze the status and configuration data. Likewise, the remote process controllers 16, and any other device within the process control system 10 (though not specifically shown), may communicate status and configuration data to the asset management system 32.

In accordance with embodiments of the present invention, rather than manual entry, the location and interconnectivity of the illustrative remote process controllers 16-20 and the field devices 14 may be determined by message router 22 and provided to the asset management system. In particular, by analyzing or "snooping" messages transferred through the message router, the message router can determine not only the presence of a particular device, but also how that device is interconnected with the remaining devices. Using this information, the message router 22 may generate a tree or hierarchical structure of the process control system, and that hierarchical structure may be supplied to the asset management system 32 as an indication of the assets to be managed.

Figure 2:
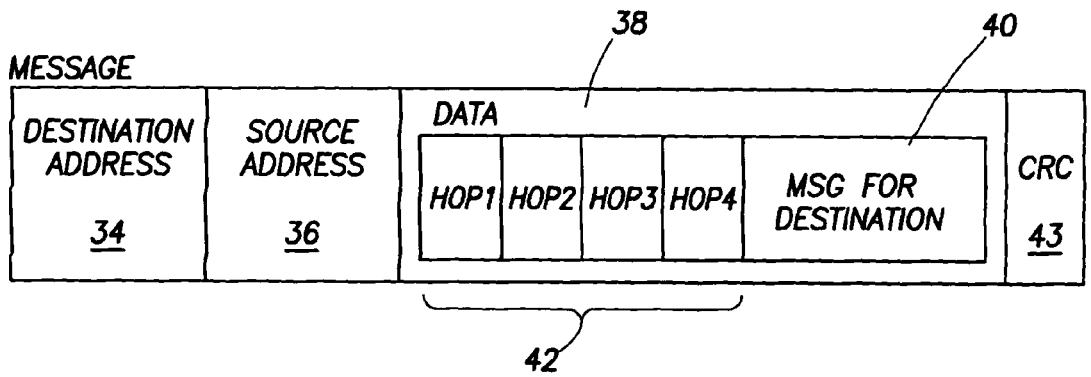
FIG. 2 shows a message format that may be used in accordance with at least some embodiments of the invention.

The reading or snooping of the messages may take several forms. In some embodiments, the messages themselves may contain information as to the hierarchical structure of the process control system 10. For example, in some embodiments the remote process controllers 16-20 may be ROCs produced by Emerson Process Management. In this illustrative case, the communication protocol between the data acquisition system 12 and the remote process controllers 16-20 (regardless of the link layer physical characteristics), may be ROC protocol. Some message formats in the ROC protocol may have embedded therein not only the source and destination addresses, but also the intermediate devices through which the message should pass to arrive at the destination. FIG. 2 shows an illustrative message that may be transferred between devices in the process control system 10. In particular, the message may comprise a destination address 34 as well as a source address 36. The data 38 portion of the message may comprise not only the message (MSG) 40 for the destination device, but also the addresses of a plurality of intermediate devices (illustrated in FIG. 2 as a HOPs 42). Finally, the message may contain cyclic redundancy check (CRC) codes 43. Thus, in systems where the messages themselves contain the information regarding intermediate devices for message delivery, the message router 22 analyzes at least some of the messages in order to determine the hierarchical structure of the overall process control system 10, and information about the hierarchical structure then may be delivered to the asset management system 32.

In addition to, or in place of, messages that themselves contain information regarding the hierarchical structure of the process control system, the message router 22 of the various embodiments may also be implemented to transfer messages (e.g., from the data acquisition system to any of the various field devices 14) without those messages specifically identifying the intermediate devices. In these embodiments, the message router may know to which port to route a message based on the destination address and an entry in a table 32. In these situations, however, the message router may be unaware of the number of intervening devices between the message router and the destination. In order to determine the hierarchical structure of the control system 10 in these embodiments, the message router 22 may analyze each message packet to determine whether the location in the hierarchical structure of the destination address is known. If the destination is not known, then the message router 22 may perform a trace route (TRACERT) type function to identify the intervening devices between the message router 22 and the newly identified device within the control system 10. This process will be discussed more fully below with respect to FIG. 4.

Figure 3:
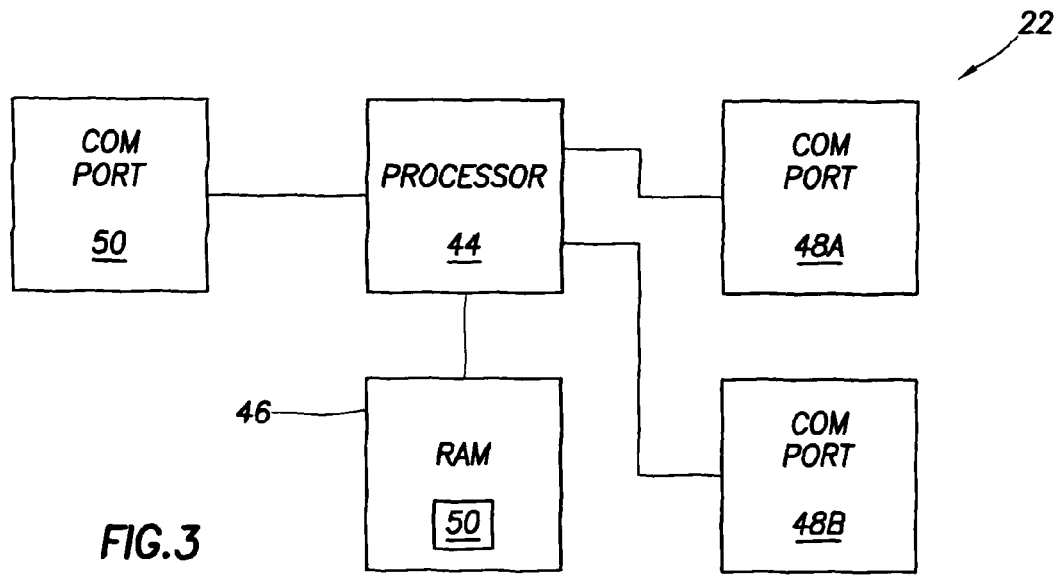
FIG. 3 shows a message router in greater detail in accordance with embodiments of the invention.

FIG. 3 shows in greater detail a message router 22 in accordance with embodiments of the invention. In particular, the message router may comprise a processor 44 coupled to a random access memory (RAM) 46. The processor 44 may take many forms. In some embodiments, the processor may be a microcontroller, and thus the RAM 46 functionality, along with other components such as read only memory (ROM) and communications capabilities, may be integrated on a single semiconductor die. In alternative embodiments, the processor 44 may be a standalone processor (e.g., a processor manufactured by Intel® Freescale/Motorola and/or AMD), and thus may be coupled to other individual components, such as the RAM 46. Moreover, processor 44 may be an application specific integrated circuit (ASIC), a field programmable gate array (FPGA), and/or system on a chip. Regardless of the precise nature of the processor 44, the processor executes software programs to perform the desired functions, such as message routing and building hierarchical structures of the overall process control system 10 in which the message router 22 is coupled.

The processor 44 may couple to and communicate with downstream devices by way of communications (COM) ports 48. The precise nature of the communication ports 48 depend on the communication channel between the message router and downstream devices. One or more of the communication ports 48 may implement: control of a radio system for communication to downstream devices; a satellite-based communication for downstream devices; or modem control for controlling a dial-up connection to downstream devices. This list is not exhaustive. Likewise, the message router 22 may comprise a communication port 50 for communicating with upstream devices, such as data acquisition system 12 and asset management system 32. In accordance with at least some embodiments of the invention, the communication port 50 may be a communication port capable of communicating over an Ethernet network, but this is not strictly required.

Figure 4:
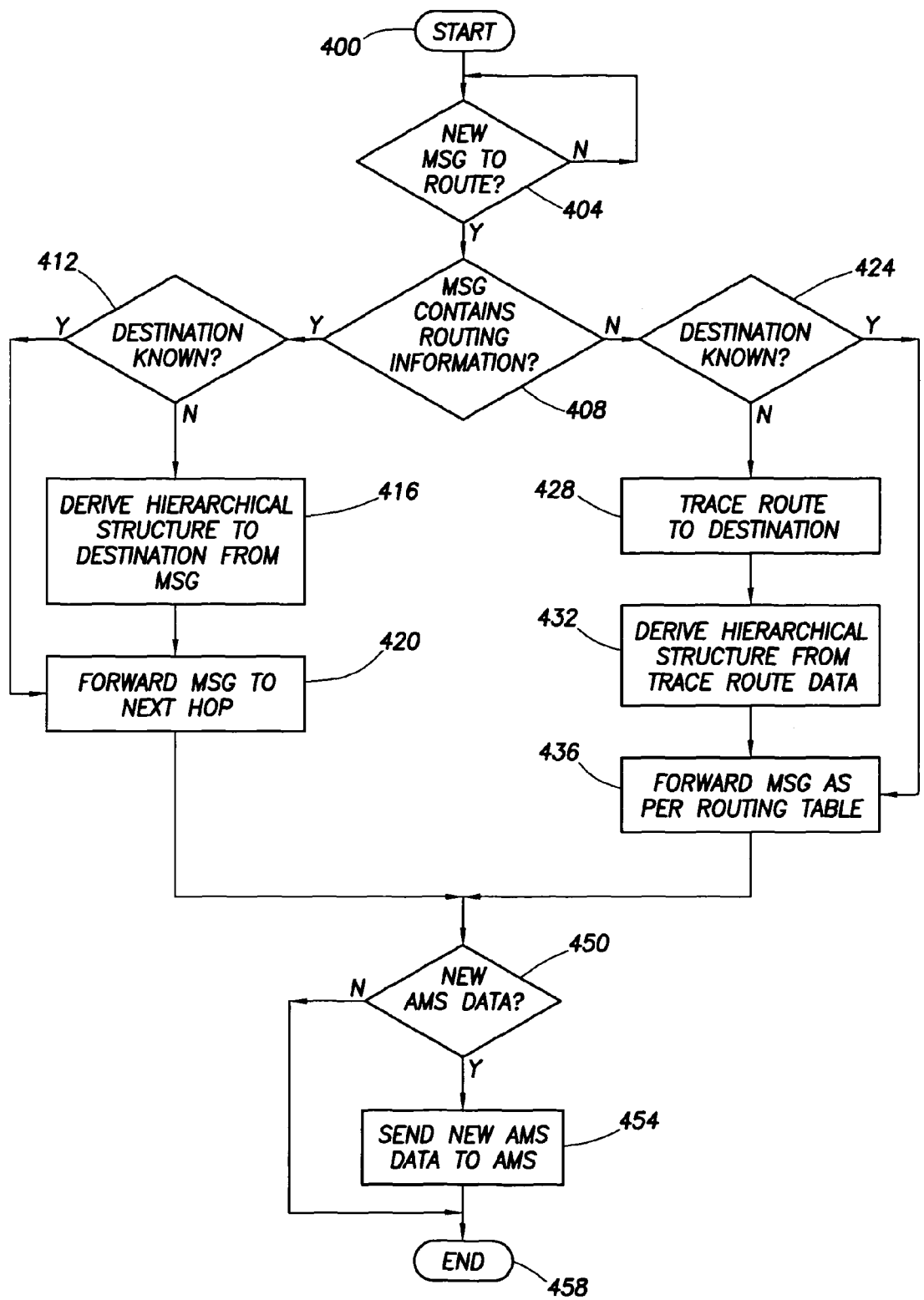
FIG. 4 shows a flow diagram of a method that may be implemented in accordance with embodiments of the invention.

FIG. 4 illustrates a flow diagram that may be implemented by the processor 44 of the message router 22. In particular, the process may start (block 400) and move to a determination of whether there is a new message (MSG) to be routed by the message router (block 404). This aspect of the message router may simply loop if there are no messages to be routed. If, on the other hand, a new message arrives (e.g., a new message from the data acquisition system 12 destined for one of the field devices 14), then the next step may be a determination of whether the message itself contains routing information (block 408). If the message contains routing information, the next step may be a determination of whether the message router 22 is aware of, and/or knows the location of, the intended destination of the message (block 412). If the destination has not been previously identified by the message router 22, the next step may be deriving the destination's hierarchical structure within the system from the message (block 416). Thereafter, the message router may forward the message to the next location or HOP (block 420). Returning to the determination of whether the destination is known (block 412), if the destination is known, the process moves directly to forwarding the message to the next HOP (block 420).

Still referring to FIG. 4, if the message does not contain routing information (block 408), the next step may be a determination of whether the destination indicated in the message is known (block 424). If the destination is not known, the message router 22 may implement a trace route program to the destination address (block 428). Similar to a trace utilized in Internet communications, a trace route in accordance with embodiments of the invention forces each intermediate device between the device that instituted the trace route and the destination to identify itself (possibly in terms of an IP address), to the instituting device. By analyzing the information returned from the trace route procedure, the message router 22 may derive the hierarchical structure that includes the newly identified destination device (block 432). Thereafter, the message may be forwarded (block 436) in accordance with information in a routing table 50 (see FIG. 3) of the message router 22.

In alternative embodiments, the message router 22 may send a broadcast message to all addresses requesting acknowledgement from those downstream devices. This mechanism could be used to verify the continued connectivity of known devices, but also may be used to identify previously unknown down stream devices. Further still down stream devices that have the functionality to be part of the tree structure, e.g., remote processor controller 16 (of FIG. 1), may also have the capability to report to the message router 22 that they are the end or last node of the tree structure.

Still referring to FIG. 4, independent of whether the message contains the routing information or if the message is routed by way of the routing table, the next step in the process may be a determination of whether any new asset management system data has been derived from the message routing procedures (block 450). If new asset management system data has been determined, the next step in the process may be sending that asset management data to the asset management system 32 (block 454), and thereafter the process may end (block 458). If no new asset management system data has been derived (at block 450), then the process may simply end (block 458).

The illustrative method of FIG. 4 may be operable in systems that utilize both messages that contain the routing information, as well as messages that rely on information within a routing table 50 of the message router. However, a message router 22, in accordance with embodiments of the invention, may also be used in systems that use exclusively one message format. In these situations, the steps regarding the alternate message format may simply be disregarded. Moreover, while FIG. 4 shows that new asset management system data may be sent on each discovery of a new device, it is within the contemplation of this invention that the message router 22 may only deliver the new asset management system data upon request, or after a certain amount of new asset management system data has been determined. Finally, the illustrative method of FIG. 4 shows that after forwarding the messages (and possibly sending the new asset management system data), the process ends (at block 458); however, it should be understood that the method illustrated in FIG. 4 is continuing, and in fact there may be multiple instances of software implementing the method of FIG. 4 executing in the processor 44 of the message router 22 at any one time.

Figure 5:
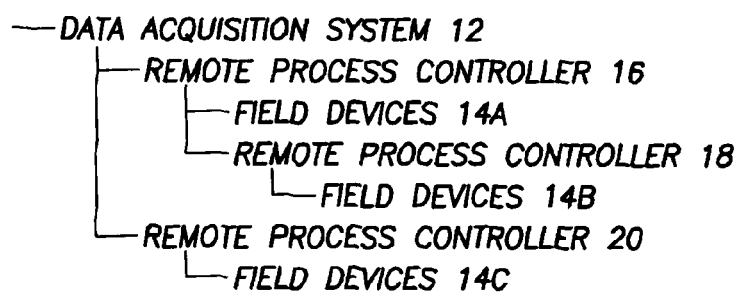
FIG. 5 shows an illustrative hierarchical structure that may be derived by the message router in accordance with embodiments of the invention.

FIG. 1 shows an illustrative process control system 10, including illustrative interconnections of the various devices. Implementing the method illustrated in FIG. 4, a message router 22, by analyzing messages from the data acquisition system 12 directed to one or more of the remote controllers 16-20 and/or field devices 14, may derive the hierarchical structure of such a system, and FIG. 5 illustrates a hierarchical system for the exemplary system of FIG. 1. Note how in each case the field devices are associated with their attached remote process controller. Note also the exemplary case of remote process controller 18 being accessible only by communications to and through the remote process controller 16. It is this type of information that the message router 22 of the various embodiments may derive and provide to the asset management system 32. In addition to this hierarchical structure, the message router 22 may also query downstream devices for information such as the serial numbers, transmitter types, calibration information, and the like, and also provide that information to the asset management system 32.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
    receiving a message originated by a data acquisition system and destined for a remote process controller, the receiving by a message router;
    using content of the message to determine a hierarchical structure of a system between the data acquisition system and the remote process controller;
    forwarding the message by the message router; and
    passing information related to the hierarchical structure to an asset management system.

2. The method as defined in claim 1 wherein using the content further comprises reading routing information from the message, and using the routing information to determine the hierarchical structure.

3. The method as defined in claim 1 wherein using the content further comprises:
    reading a destination identifier from the message;
    running a trace route procedure to the destination identifier; and
    determining the hierarchical structure from information obtained from the trace route procedure.

4. The method as defined in claim 1 further comprising forwarding the message through one of a first or second communication channels coupled to the message router.

5. A message router comprising:
    a first communication port; and
    a second communication port coupled to the first communication port;
    wherein the message router receives a message on the first communication port, and forwards the message out the second communication port; and
    wherein the message router reads content of the message and uses the content to determine, at least in part, a hierarchical structure of devices between the source of the message and the intended destination.

6. The message router as defined in claim 5 wherein the message router reads routing information from the message, and uses the routing information to determine the hierarchical structure.

7. The message router as defined in claim 5 wherein the message router reads a destination identifier from the message, runs a trace route procedure to the destination identifier, and determines the hierarchical structure from information obtained from the trace route procedure.

8. The message router as defined in claim 5 further comprising:
    a third communication port coupled to the first communication port;
    wherein the message router receives the message received on the first communication port, and forwards the message out one of the second or third communication port.

9. The message router as defined in claim 8 wherein the message router reads routing information from the message, and uses the routing information to determine the hierarchical structure.

10. The message router as defined in claim 8 wherein the message router reads a destination identifier from the message, runs a trace route procedure to the destination identifier, and determines the hierarchical structure from information obtained from the trace route procedure.

11. The message router as defined in claim 8 wherein the message router forwards the message out one of the first second or third communication port based, at least in part, on information in a routing table.

12. The message router as defined in claim 5 wherein the message routers sends information regarding the hierarchical structure to an asset management system.

13. A message routing system comprising:
a processor;
a random access memory (RAM) coupled to the processor;
a first communication port coupled to the processor, the first communication port receives a message originated by a source device and destined for a target device; and
a second communication port coupled to the processor, wherein the message routing system forwards at least some messages received on the first communication port through the second communication port;
wherein the processor, executing a program, reads content of the message and uses the content to determine configuration of devices between the source device and the target device.

14. The message routing system as defined in claim 13 further comprising a third communication port coupled to the processor, and wherein the message routing system forwards at least some of messages received on the first communication port through the third communication port.

15. The message routing system as defined in claim 14 wherein the processor, executing a program, reads routing information from the message, and uses the routing information to determine the configuration of devices between the source device and the target device.

16. The message routing system as defined in claim 14 wherein the processor, executing a program, reads a target device identifier from the message, runs a trace route procedure to the target address identifier, and determines the configuration of devices between the source device and the target device from information obtained from the trace route procedure.

17. The message routing system as defined in claim 13 wherein the processor, executing the a program, reads routing information from the message, and uses the routing information to determine the configuration of devices between the source device and the target device.

18. The message routing system as defined in claim 13 wherein the processor, executing a program, reads a target device identifier from the message, runs a trace route procedure to the target address identifier, and determines the configuration of devices between the source device and the target device from information obtained from the trace route procedure.

19. A system comprising:
a plurality of remote process controllers coupled to field devices;
a message router coupled to the plurality of remote process controllers;
a data acquisition system coupled to the message router; and
an asset management system coupled to the message router;
wherein the message router snoops information from the message and uses the information to determine a tree structure between the data acquisition system and at least one of the plurality of remote process controllers.

20. The system as defined in claim 19 wherein the message router sends information regarding the tree structure to the asset management system.

21. The system as defined in claim 19 wherein the message router snoops routing information from the message, and uses the routing information to determine the tree structure.

22. The system as defined in claim 19 wherein the message router snoops a target field controller identification number from the message, runs a trace route procedure to the target field controller identification number, and uses information from the trace route procedure to determine the tree structure.

* * * * *